S. COLLINS.
Churn.
No. 220,750. Patented Oct. 21, 1879.
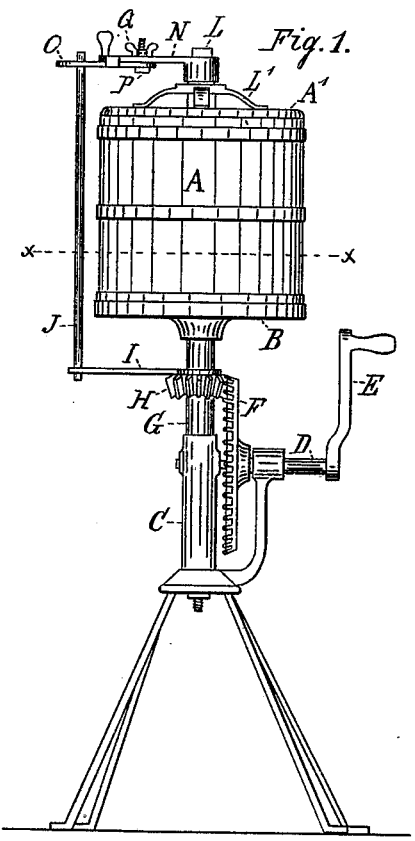
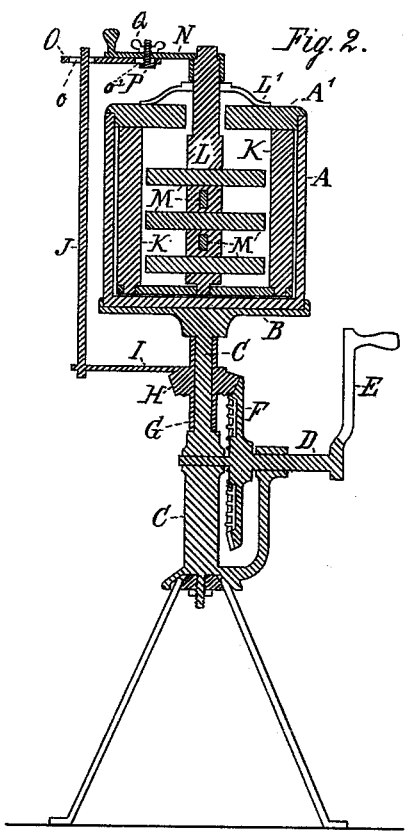
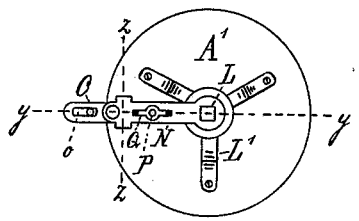
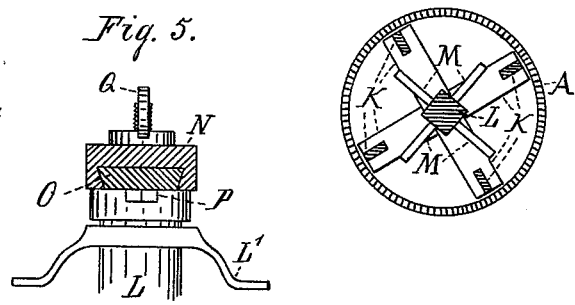
WITNESSES.
James B. Liziers,
R. P. Daggett
INVENTOR.
Stephen Collins,
PER
C. Bradford,
ATTORNEY.
N. PETERS, PHOTO-LITHOGRAPHER, WASHINGTON, D. C.

UNITED STATES PATENT OFFICE.

STEPHEN COLLINS, OF INDIANAPOLIS, INDIANA.

IMPROVEMENT IN CHURNS.

Specification forming part of Letters Patent No. 220,750, dated October 21, 1879; application filed June 16, 1879.

*To all whom it may concern:*

Be it known that I, STEPHEN COLLINS, of the city of Indianapolis, county of Marion, and State of Indiana, have invented certain new and useful Improvements in Churns, of which the following is a specification.

Reference is had to the accompanying drawings, which are made a part hereof, and on which similar letters of reference indicate similar parts.

Figure 1 is a side elevation of my improved churn. Fig. 2 is a transverse vertical section thereof on the dotted line $y\ y$ in Fig. 3. Fig. 3 is a top or plan view thereof. Fig. 4 is a transverse horizontal section on the dotted line $x\ x$ in Fig. 1. Fig. 5 is a transverse vertical section, on an enlarged scale, of the crank N and extension O, looking from the dotted line $z\ z$ toward the shaft L.

In said drawings, the portion marked A represents the churn-body; B, a stand upon which it rests, and to which it may or may not be fastened; C, the standard connecting said stand to the feet of the churn, and to which the driving mechanism is attached; D, a horizontal shaft, upon which is a crank, E, and a bevel-gear wheel, F; G, a vertical sleeve upon the standard C, upon which is a second bevel-gear wheel, H, preferably of smaller diameter than the first, with which it engages and by which it is actuated; I, an arm, also upon the sleeve G, which projects horizontally far enough to support a vertical standard, J, by which a connection is made outside the churn-body with the dash-driving mechanism above; K, a frame-work, rigidly attached to the cover A' of the churn-body, and forming the stationary portion of the dash. Within this frame-work, and resting in bearings, one of which is formed in the bottom of said frame-work and the other by the spider-like device L' upon the outside of the cover, is the upright shaft L, which, with its arms M M, form the movable portion of the dash. This dash, as a whole, is an effective one; but I make no claim upon its construction, as but little, if any, difference exists between it and others, considered separately.

The spider-like device L' is an important element in a churn of this description, having only a single arm and standard, I J, to connect the driving mechanism to the upper crank. There should always be an opening in the cover about the shaft, which could not be had if the shaft-bearing were formed therein. It is also best to have this bearing (which is of metal) far enough above the cover so that the cream cannot be thrown into it by the agitation of the dash, as, should it be, a deleterious substance would be formed by the friction of the shaft and bearing, which would enter the churn and impair the purity of its contents. This spider-like device is not new, considered by itself, and is only claimed in the peculiar combination contemplated by this invention.

Upon the upper end of the shaft L, outside the churn, is a crank, N, to which is appropriately attached a removable extension-piece, O, which is connected, through the standard J and arm I, with the driving mechanism. It is well-known to those skilled in butter-making that it is sometimes desirable to work the dash by hand rather than by machinery in the final "gathering" of the butter. The extension-piece O is therefore removable, so that the dash can be operated directly through its own rigidly-attached crank N without disturbing either the driving mechanism or the upwardly-projecting standard J, as said crank, without such extension-piece, is not long enough to reach said standard.

I contemplate using stone jars or other receptacles of varying sizes for bodies to these churns, which will usually sit loosely upon the stand B. Therefore their centers may not always be exactly over the center of the standard C, especially as the users of churns are usually persons not skilled mechanically; consequently the standard J will not always be exactly the same distance from the shaft L during its entire revolution. An elongated slot, $o$, is therefore provided in the extension-piece O, through which said standard passes, and said standard is thereby enabled to make its revolutions freely notwithstanding any slight difference which may thus occur in the centering of the parts mentioned.

The manner which I have adopted to connect the extension O to the crank N is to form a dovetail upon the under side of the latter, into which the former slides, and where it is securely held by the bolt P and the thumb-nut Q. I do not, however, make any claim to this particular form of connection, or consider it any part of my invention.

The frame-work and mechanism of my churn are preferably constructed of metal. The cream-receptacle I generally prefer to have of stoneware, an ordinary stone jar being well suited for the purpose. The cover and dashers are usually of wood. I make no claim to invention, however, in the selection of materials, and expect to use those named or others, as will best suit my purpose.

As the dash is not connected to the churn-body, but wholly to the cover, it can at once be removed when the churning is done, and the butter handled without any hinderances in the shape of projections or mechanism within the body of the churn. This feature, however, considered by itself, I do not claim as peculiar to my invention.

In operation the jar or other vessel containing the cream is set on the stand B, where it may be, if thought necessary, held by proper fastenings. The cover, bearing the dash mechanism, is then placed thereon, the slot o in the extension O of the crank N engaging with the standard J. The crank E, being turned, drives the dash, which operates to bring the butter in the usual manner.

I am aware that churns have been constructed in which the driving mechanism was located below the churn-body and connected to the churning mechanism above by two standards running up on each side of said body and a cross-bar between them. Such a construction, however, is neither as cheap nor convenient as one embodying only a single standard and crank, one difference being that in such a churn the churning mechanism cannot conveniently be disconnected from the driving mechanism, nor can it be operated by hand, except by the use of a separate crank.

Having thus fully described my said invention, what I claim as new, and desire to secure by Letters Patent, is—

1. In the operating mechanism of a churn, the combination, with the standard J and crank N, of the removable extension-piece O, connecting said crank to said standard, and operating substantially in the manner and for the purposes herein specified.

2. In the operating mechanism of a churn, the combination, with a standard, J, revolving circumferentially in relation to the churn-body, of a crank or arm connecting said standard and the shaft of the churn-dash, said arm having an elongated slot for the reception of the end of said standard, whereby said standard and said dash-shaft may occupy varying relations to each other during the course of their revolutions, substantially as and for the purposes set forth.

In witness whereof I have hereunto set my hand and seal, at Indianapolis, Indiana, this 14th day of June, A. D. 1879.

STEPHEN COLLINS. [L. S.]

In presence of—
C. BRADFORD,
JAMES LAFEBER.